United States Patent [19]

Lauer et al.

[11] Patent Number: 4,644,483

[45] Date of Patent: Feb. 17, 1987

[54] APPARATUS FOR DETERMINING THE TRANSIT TIME OF ULTRASONIC PULSES IN A FLUID

[75] Inventors: Reinhard Lauer, Waldkirch; Werner Hartmann, Emmendingen, both of Fed. Rep. of Germany

[73] Assignee: Erwin Sick GmbH Optik-Elektronik, Waldkirch, Fed. Rep. of Germany

[21] Appl. No.: 606,249

[22] Filed: May 2, 1984

[30] Foreign Application Priority Data

May 6, 1983 [DE] Fed. Rep. of Germany ....... 3316630

[51] Int. Cl.[4] .................. G04F 10/00; G01S 3/80; G01F 1/32
[52] U.S. Cl. .................. 364/569; 73/861.27; 367/123
[58] Field of Search ............ 364/569, 579, 510; 367/118, 123; 73/24, 861.27, 861.06

[56] References Cited

U.S. PATENT DOCUMENTS

| | | | |
|---|---|---|---|
| 3,588,699 | 6/1971 | Pysnik | 364/569 X |
| 3,906,213 | 9/1975 | Meriaux et al. | 364/569 |
| 4,053,888 | 10/1977 | Robin et al. | 364/569 X |
| 4,279,019 | 7/1981 | Heyser | 364/569 |
| 4,334,431 | 6/1982 | Kohno et al. | 73/597 |
| 4,375,900 | 3/1983 | Tachibana et al. | 367/118 X |
| 4,494,213 | 1/1985 | Thompson | 364/510 X |
| 4,510,587 | 4/1985 | Schneider | 367/118 |
| 4,557,148 | 12/1985 | Akiyama | 364/510 X |
| 4,576,047 | 3/1986 | Lauer et al. | 73/861.06 |
| 4,598,593 | 7/1986 | Sheen et al. | 73/861.06 |

OTHER PUBLICATIONS

Knapp et al, "The Generalized Correlation Method for Estimation of Time Delay", *IEEE Trans. on Acoustics, Speech and Sig. Proc.*, vol. ASSP-24, No. 4, Aug. 1976, pp. 320-327.
Maiwald, "Blockwise Updating in Decision-Aided Timing Recovery", *IBM Tech. Disc. Bull.*, vol. 19, No. 12, May 1977, pp. 4782-4784.

*Primary Examiner*—Errol A. Krass
*Assistant Examiner*—Joseph L. Dixon

[57] ABSTRACT

An apparatus for determining the transit time of ultrasonic pulses in a fluid has two spaced apart electroacoustic converters (11, 20). A transmitter signal proportional to the sound pressure is applied via a controllable delay circuit (23) to a multiplication circuit (25) to which the received signal is also passed. The product signal is in turn passed to a transit time detector circuit (10) (FIG. 1).

4 Claims, 5 Drawing Figures

APPARATUS FOR DETERMINING THE TRANSIT TIME OF ULTRASONIC PULSES IN A FLUID

BACKGROUND OF THE INVENTION

The invention relates to an apparatus for determining the transit time of ultrasonic pulses in a fluid, in particular in a gas, the apparatus comprising first and second spaced apart electro-acoustic converters of which one transmits ultrasonic pulses along the measurement path contained in the fluid while the other receives pulses which have travelled along the measurement path, wherein both converters are connected to a correlation circuit in order to determine the transit times of the pulses.

An apparatus of this kind is used in a method for measuring the speed of flow of a gaseous medium. For this purpose ultrasonic pulses are transmitted along a measurement path contained in the gaseous medium, in a direction having at least a component in common with the direction of flow of the medium. The speed of flow of the medium can be determined by measuring the pulse transit time for ultrasonic pulses travelling in opposite directions along the measurement path, from the transit time differences.

It is important for a troublefree correlation measurement that the sound pressure signals of the transmitter and the receiver are converted into corresponding electrical signals by the converters, which are preferably composite piezoelectric oscillators. A signal of this kind automatically occurs at the output of the receiving converter, the corresponding signal from the transmitting converter must be generated by special means. Such means are for example described in applicants' co-pending patent application having the title "Apparatus for determining the transit times of ultrasonic pulses in a fluid", (Ser. No. 606,250, filed May 2, 1984, now U.S. Pat. No. 4,576,047). The generation of a transmitter signal of this kind at the input of the correlation circuit is also a prerequisite for the present invention and will be described later in this specification.

The transmit time $\tau_0$ of the ultrasonic signal is derived from the maximum of the cross-correlation function:

$$k_{xy}(\tau) = \int_{-\infty}^{+\infty} x(t - \tau)y(t)dt \tag{1}$$

The cross-correlation function is thus the time averaged product of the received signal y(t) and the transmitted signal x(t) which is delayed by the delay time $\tau$.

Rather than the complicated search for the maximum it is more favorable, from the point of view of the technical circuitry, to seek the null point of $dk_{xy}/d\tau$.

Apparatus simplifications are known which are based on the fact that the following expression applies with the maximum of the cross-correlation function with the delay time $\tau_0$.

$$\int_{-\infty}^{+\infty} x(t - \tau_0)\dot{y}(t)dt = 0 \tag{2}$$

$\dot{y}(t)$ is in this case the time derivative of the signal y(t).

A further technical simplification of the apparatus is possible by making use of the so-called polarity correlation:

$$k_{sgnx sgny}(\tau) = \int_{-\infty}^{+\infty} sgn[x(t - \tau)] \cdot sgn[\dot{y}(t)]dt \tag{3}$$

The advantage of the polarity correlation in comparison with the analog multiplication of equation (2) lies in the fact that the analog multiplication, which is subjected to drift, is omitted and that the signals can be digitally processed. However, the signal y(t) has to be differentiated with respect to time in both methods.

A filter having the (normed) frequency response $$f(jw) = \frac{j\dfrac{w}{w_g}}{1 + j\dfrac{w}{w_g}} \tag{2}$$

is used for the differentiation. The term in the denominator is undesired but cannot be avoided. Accordingly a compensation has to take place. Another disadvantage of the differentiation lies in the fact that signal processing without non-linearity errors becomes increasingly more difficult, in particular for steep signal flanks (for example rectangular waves).

The object of the present invention is to provide an apparatus of the initially named kind in which one can avoid the differentiation with respect to time.

SUMMARY OF THE INVENTION

In order to satisfy this object the invention provides that a transmitter signal proportional to the sound pressure is applied to a multiplication circuit via a controllable delay circuit, with the received signal also being passed to the multiplication circuit; and that the product signal formed by the multiplication circuit is passed to a transit time detector circuit.

In a preferred embodiment of the invention a control line by which the delay circuit is automatically regulated to a value corresponding to the signal transit time passes from the output of the transit time detector circuit back to the delay circuit.

In a development of this embodiment a transit time modulator is inserted between the delay circuit and the multiplication circuit.

The transit time detector circuit preferably has a band-pass filter which is connected to the multiplication circuit and is tuned to the modulation frequency.

In a further development of this embodiment a rectangular wave generator which generates the modulation frequency is connected to the transit time modulator and rectangularly modifies the transit time.

An especially preferred embodiment is characterised in that the band-pass filter is connected to an integration circuit via a sign changing switch which is periodically switched over by the rectangular wave generator in time with the modulation frequency.

The basic thought of the invention is to be seen in the fact that the maximum of the cross-correlation function is present when the delay of the transmitted signal corresponds to the transit time of the ultrasonic pulses. The special feature of the apparatus of the invention now lies in the fact that it is not necessary to actually form the cross-correlation function in the first place.

The integration time depends on the rate of measurement, on the carrier frequency of the pulses, on the standard deviation of the transit times, and on the desired measurement accuracy. As a rule of thumb one can say that the integration time should be larger than or equal to 50 times the duration of one measurement cycle. Having regard to the choice of the modulation frequency care should be taken that as many periods of the modulation frequency as possible should be contained in the length of one ultrasonic pulse.

The sign changing switch of the invention means that a DC component is obtained from the AC signal after the band pass filter, with the DC component being positive or negative depending on the deviation of the delay time from the transit time of the ultrasonic signals. The DC component disappears when the delay time and the ultrasonic transit time are the same.

The apparatus of the invention makes it possible to determine the transit time very accurately. Despite diverse sources of disturbance the accuracy of determination of the individual transit times lies in the per mil range.

Thus, in accordance with the invention, the transmitted signal which is to be delayed by a time $\tau$ is modulated by a transit time variation $\pm \Delta \tau$ and multiplied by the received signal. The transit time modulator can, in accordance with the invention, be formed by a delay circuit (ALL-pass) with the modulation frequency $f_m$. A rectangular wave generator acts on the delay circuit.

The center frequency $f_m$ of the modulated part is filtered from the product of the delayed transit time modulated transmitted signal and the received signal by means of the band pass filter. The AC signal arising as a result of the transit time modulation is rectified after the band pass filter by means of the sign changing switch in time with the modulation frequency $f_m$. The rectified AC signal is integrated and used for the automatic zero point search.

It is important that in the cross-correlation carried out in accordance with the invention there is no need to carry out a differentiation which, amongst other things, would have the disadvantage that signal processing without non-linearity errors would be relatively difficult, in particular with steep signal flanks (for example rectangular flanks).

BRIEF DESCRIPTION OF THE DRAWING

The invention will now be described in the following by way of example and with reference to the drawings in which:

FIG. 3(a) reproducing the delayed transmitter signal; FIG. 3(b) representing the transit time modulation, and FIG. 3(c) representing the transit time modulated transmitter signal prior to multiplication.

DETAILED DESCRIPTION OF A PREFERRED EMBODIMENT

Figure 1:
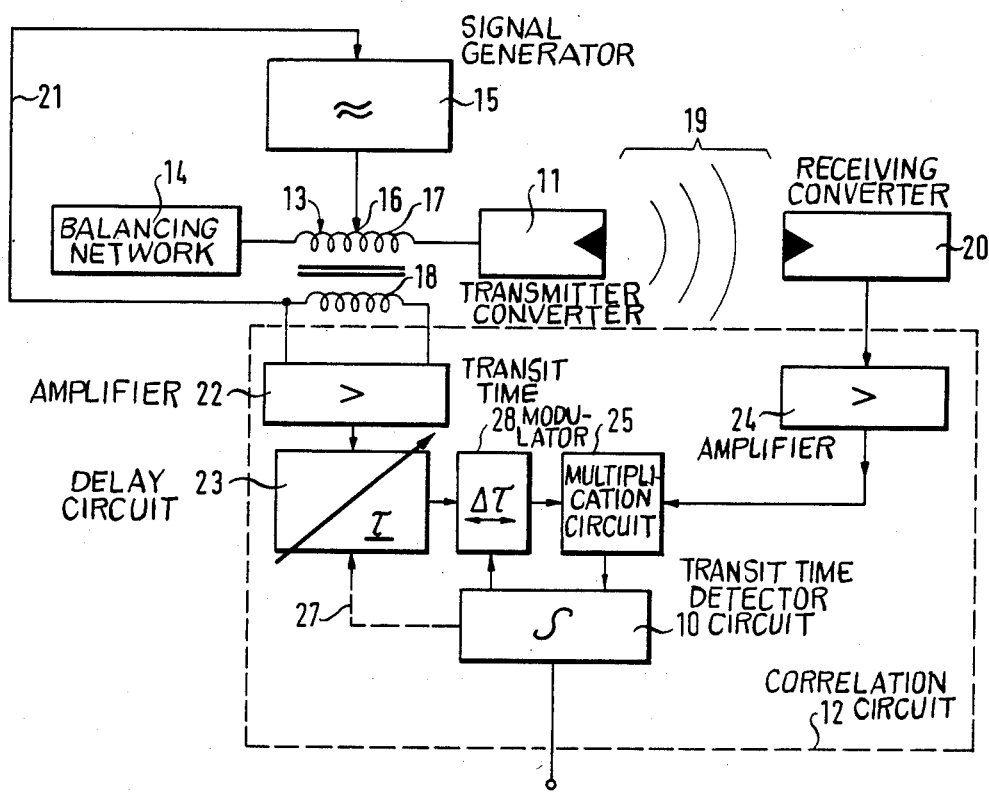
FIG. 1 is a simplified block circuit diagram of an apparatus in accordance with the invention for determining the transit time of ultrasonic pulses using a hybrid circuit important for the generation of the transmitter signal in the correlation circuit.

As seen in FIG. 1 an electroacoustic ultrasonic transmitter converter 11 is arranged at one end of a measuring path 19 which extends through a gas in which the transit time of ultrasonic pulses is to be measured. An electro-acoustic receiving converter 20 lies opposite to and is spaced from the transmitter converter 11. Both converters are constructed as composite piezoelectric oscillators. The transmitter converter 11 is fed via one end of the primary winding 17 of an inductive transformer, the other end of which is connected to a balancing network 14. The primary winding 17 also has a central tap 16 to which is applied the output of a signal generator 15 which transmits pulse repetition signals. The balancing network is so constructed, in dependence on the location of the central tap 16, that a magnetic excitation is generated in the half of the primary winding 17 of the transformer 13 associated with the balancing network 14 which opposes the magnetic excitation generated in the other half of the winding by the generator signal, so that in this respect no signal is generated in the secondary winding 18 of the transformer 13.

The secondary winding 18 is however connected to a correlation circuit 12 in the same way as the receiver 20 as will be described in detail later. The output signal of the transformer 13 is moreover fed back to the signal generator 15 via a feedback line 21. In this way a self-excited oscillator circuit is obtained which is automatically tuned to the frequency of the transmitter converter 11. The circuit for generating individual ultrasonic pulses is integrated in the signal generator 15 and is not illustrated in detail.

As a result of the hybrid network 11, 13, 14 of the invention there arises in the secondary winding 18 only an electrical signal which is brought about by the membrane deflection of the transmitter converter 11 and which is proportional to the sound pressure generated by the transmitter converter 11. As a signal proportional to the sound pressure is also transmitted to the correlation circuit 12 from the receiver converter 20 the correlation circuit compares, in the required manner, two signals which are actually fully correlated with one another which leads to an accurate determination of the transit time.

For the sake of simplicity the connection of the individual circuits to earth, particularly in the area of the hybrid network 11, 13, 14 is not shown in detail.

The secondary winding 18 of the transformer 13 is connected via an amplifier 22 to a controllable delay circuit 23 by means of which a variable delay $\tau$ can be imposed on the signal coming from the transmitter converter 11 which is proportional to the sound pressure signal.

The output of the delay circuit 23 is applied via a transit time modulator 28 to the one input of a multiplication circuit 25. The output signal from the receiver converter 20 is supplied to the other input of the multiplication circuit 25 via an amplifier 24. The output of the multiplication circuit 25 is applied to a transit time detector circuit 10 which makes it possible to detect the time average of the maximum of the product formed in the multiplication circuit 25. The output signal of the transit time detector circuit 10 corresponds to the derivative of the cross-correlation function after the time displacement $\tau$ and can for example be tapped off as a DC voltage the size and sign of which depends on the difference between the delay time $\tau$ and the signal transit time. The DC voltage of the transit time detector circuit 10 serves to regulate the delay time $\tau$ in the delay circuit 23 to a value $\tau_0$ which corresponds to the signal transit time.

As a signal is passed to the amplifier 22 which is proportional to the ultrasonic pressure generated by the transmitter converter 11, all deformations of the sound pressure signal, caused for example by mechanical short-comings of the composite piezoelectric oscillator, are taken into account in the correlation circuit 12 of the invention so that these short-comings cannot impair the accuracy of the measurement of the signal transit time $\tau_0$.

The apparatus of the invention can be used anywhere where accurate determination of the transit times of ultrasonic pulses in a fluid is important. The application is thus not restricted to apparatus for the measurement of the speed of a flow of a fluid within the context of which a transit time measurement is necessary.

Figure 2:
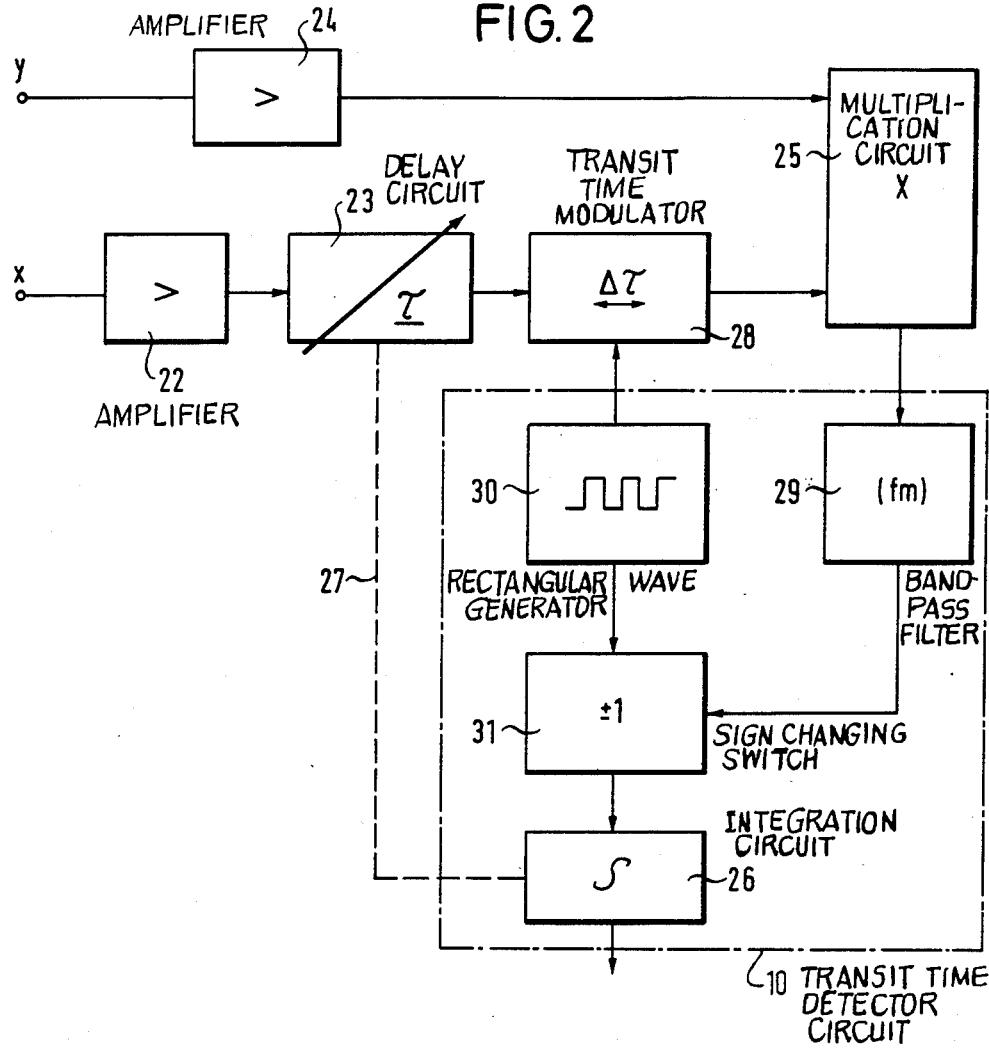
FIG. 2 is a block circuit diagram of a preferred correlation circuit for the apparatus of the invention.

The construction of the transit time detector circuit 10 can be seen in detail from FIG. 2. As shown in FIG. 2 an integration circuit 26 is present in the transit time detector circuit 10 and the integration time of the integration circuit 26 depends on the rate of measurement, on the carrier frequency of the pulses, on the standard deviation of the transit time and on the required accuracy of measurement. As a rule of thumb one can assume that the integration time should be larger than or the same as 50 times the duration of one measurement cycle.

A control line 27 can be led back from the output of the transit time detector circuit 10 to the delay circuit 23 in order to automatically regulate this delay circuit so that the output of the transit time detector circuit 10 has a zero passage. The delay time $\tau_0$ which is automatically regulated in this way then corresponds to the signal transit time along the measuring path 19.

FIG. 2 shows a preferred embodiment of the correlation circuit of FIG. 1 and the same reference numerals are used to describe parts common to FIG. 1.

The received signal y is again applied to the one input of the multiplication circuit 25 via the amplifier 24. The transmitter signal x, which is proportional to the sound pressure as a result of the hybrid network 11, 13, 14 of FIG. 1, is again connected to the regulatable delay circuit 23 via the amplifier 22. The transit time modulator 28, by means of which the transmitted pulse signal x with a pulse length approximately 1 ms is, for example, transit time modulated with a frequency of 10 kHz, is again connected between the delay circuit 23 and the multiplication circuit 25. The modulation frequency is delivered from a rectangular wave generator 30 with a frequency of 10 kHz. The modulated transit time has an amplitude $\Delta\tau$ which is the same as the duration of half a period of the modulation frequency.

Figure 3:
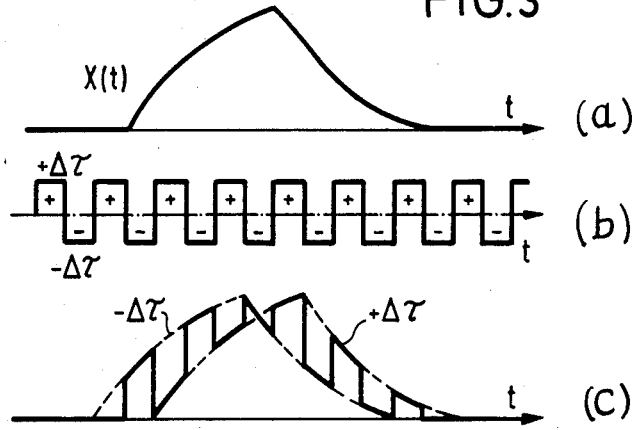
FIG. 3 shows three signal diagrams which relate to the circuit diagram of FIG. 2 and which have been drawn to the same time scale.

FIG. 3(a) shows, at the top, the ultrasonic transmitter pulse signal x which has been delayed by the delay time $\tau$. Below this in FIG. 3(b) there is shown the rectangular modulation signal which originates from the rectangular wave generator 30, and below this again, in FIG. 3(a) the modulated signal which appears at the output of the transit time modulator 25.

Returning to FIG. 2, a band-pass filter 29 is connected to the output of the multiplication circuit 25 and is tuned to the frequency of the rectangular wave generator, for example to a frequency of 10 kHz. The band-pass filter 29 thus filters the center frequency of 10 kHz out of the input signal.

Furthermore, a sign changing switch 31 is connected between the band-pass filter 29 and the integration circuit 26. The sign changing switch 31 is connected to the input of the integration circuit 26. In this way an output signal is created at the output of the integration circuit 26 which is equal to zero when the delay time $\tau$ in the delay circuit 23 corresponds to the signal transit time $\tau_0$. If this equalisation has not taken place then the output signal of the integration circuit 26 is either a positive or a negative DC voltage. By feeding this output signal back to delay circuit 23 via the control line 27 the difference between the delay time in the controllable delay circuit 23 and the transit time can be brought to zero in a simple manner.

The delay circuit 23 is preferably constructed as a bucket brigade device.

What is claimed is:

1. An apparatus for determining the transit time of ultrasonic pulses in a fluid, in particular in a gas, said apparatus comprising: a first electro-acoustic converter for transmitting ultrasonic pulses along a measurement path contained in a fluid; a second electro-acoustic converter spaced from said first converter for receiving pulses which have travelled along the measurement path; and a correlation circuit connected to said two converters for determining the transit time of the pulses, said correlation circuit comprising: a multiplication circuit, a controllable delay circuit, and a transit time modulator between said delay circuit and said multiplication circuit; said first converter being operatively connected to said multiplication circuit via said controllable delay circuit for applying a signal proportional to sound pressure generated by said first converter to said multiplication circuit, said second converter being operatively connected to said multiplication circuit for applying the signal received by said second converter to said multiplication circuit; said correlation circuit also comprising a transit time detector circuit having an input connected to said multiplication circuit for receiving a signal forming the product of the two signals applied to said multiplication circuit, and an output connected to said delay circuit for controlling the latter.

2. An apparatus according to claim 1, wherein said transit time detector circuit has a band-pass filter connected between said multiplication circuit and said delay circuit.

3. An apparatus according to claim 2, wherein said transit time detector circuit comprises a rectangular wave generator having an output connected to said transit time modulator.

4. An apparatus according to claim 3, wherein said transit time detector circuit comprises an integration circuit having an input and an output, and a sign changing switch connected between said band-pass filter and said input of said integration circuit, said rectangular wave generator being connected to said switch for periodically switching the same, the output of said integration circuit being connected to said delay circuit.

* * * * *